Sept. 11, 1962 J. J. GLOWACKI ETAL 3,053,042
SWITCHING DEVICE AND ASSOCIATED APPARATUS
Filed May 22, 1958 3 Sheets-Sheet 1

INVENTORS
JOHN J. GLOWACKI
WILLIAM C. FOX
BY
HIS ATTORNEY.

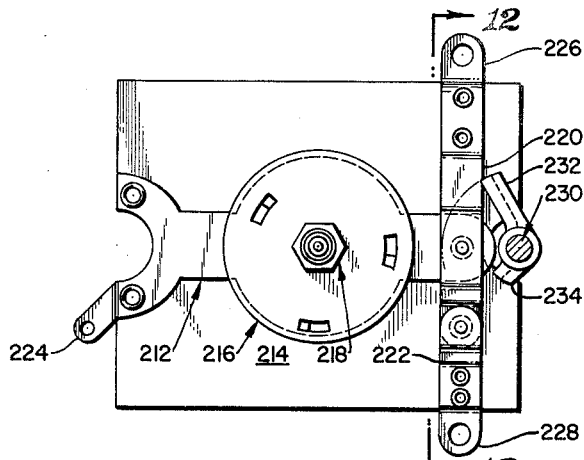
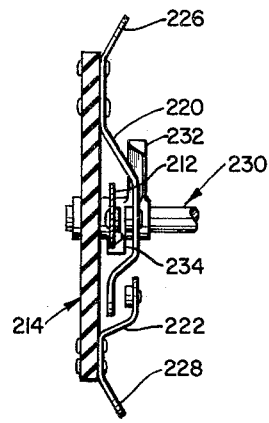
Fig. 11  Fig. 12
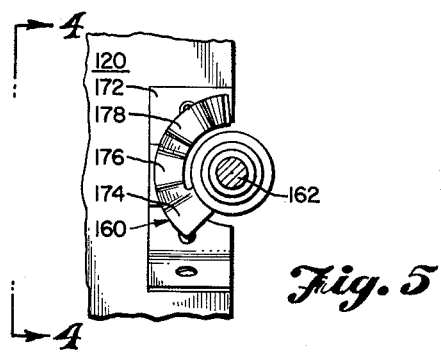
Fig. 5
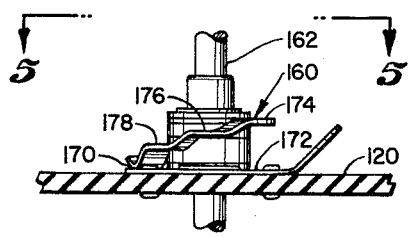
Fig. 4

Sept. 11, 1962     J. J. GLOWACKI ETAL     3,053,042
SWITCHING DEVICE AND ASSOCIATED APPARATUS
Filed May 22, 1958                         3 Sheets-Sheet 3

INVENTORS
JOHN J. GLOWACKI
WILLIAM C. FOX
BY
HIS ATTORNEY.

United States Patent Office

3,053,042
Patented Sept. 11, 1962

3,053,042
SWITCHING DEVICE AND ASSOCIATED
APPARATUS
John J. Glowacki and William C. Fox, Plainville, Conn.,
assignors to noCord, Inc., a corporation of Connecticut
Filed May 22, 1958, Ser. No. 737,066
2 Claims. (Cl. 58—152)

This invention relates to switching devices and to apparatus in which switching devices are employed.

More particularly, the invention is concerned with the provision of improved combination clock mechanisms such as, for example, combination radio-alarm clocks.

It is within the purview of the invention to provide switching devices which can be operated with extremely low mechanical power requirements. Consequently, provision is made of switching devices which, for example, will enable combination clock mechanisms to be driven electrically in an efficient manner by sources of power such as small batteries.

The difficulties inherent in providing a combined radio-alarm clock driven by a battery reside chiefly in the fact that the clock mechanism itself requires a large amount of driving power. Thus, very little additional power is available in reserve for controlling associated devices such as switches for alarms and radios. Alarms and radios can, of course, be provided with their own sources of electrical power, but switches normally require mechanical power and this mechanical power is most conveniently derived from the associated clock mechanism.

It is accordingly a principal object of the invention to provide an improved switching device which can be operated with a minimum of mechanical power. It is a direct consequence of the achieving of this object of the invention that improved combination clocks can be provided wtih particular reference being made to combination clocks which can be driven by means of a battery.

It is a further object of the invention to provide its improvements while maintaining ease of manufacture and an optimum economy of parts.

Referring particularly to combination radio-alarm clocks, it is to be noted that it is generally preferable to provide a selective sequential operation of its utilization devices.

Consequently, it is a further object of the invention to provide improved means for selective and sequential switching operations.

Briefly, to achieve the above and other of its objectives, the invention contemplates the utilization of a resiliently actuated switch which is normally maintained in loaded or stressed condition during which its contacts are open. In cooperative association with the switch is a member which is driven by the clock mechanism and which periodically removes the load from the switch to enable the switch to close an associated circuit.

This principle enables, for example, an alarm and/or a radio to be actuated selectively and/or periodically, and inasmuch as a switch is provided which is normally in a mechanically loaded condition, no power is required beyond that which is necessary to effect a periodical unloading of the switch.

In accordance with further provisions of the invention, a switch may be provided with one contact supported on a resilient member and a further contact aligned with the first contact but settable in different positions at varying distances with respect to the first contact. In operative association therewith, a member can be provided which releases the load to which the resilient device is normally subjected in steps, the position of the settable contact determining the step at which the switch thus constituted is closed.

Advantageously, the invention enables the provision of an efficiently operating combination clock which may be efficiently driven by a battery. Consequently the invention envisages, within its scope, the provision of an improved battery driven combination clock.

Other objects and features of the invention, as well as advantages thereof will appear in the following description taken with the accompanying drawing wherein is illustrated a preferred embodiment of the invention and in which:

FIGURE 4 illustrates on enlarged scale a detail of the switching mechanism including a settable contact;

FIGURE 5 illustrates, in top plan view, the mechanism of FIGURE 4;

FIGURES 11 and 12 illustrate a further embodiment of the invention.

Figure 1:
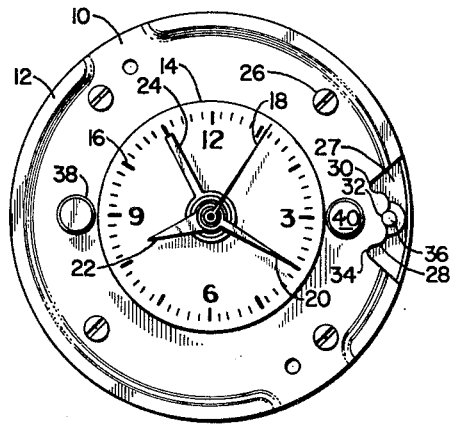
FIGURE 1 illustrates the face of a combination clock provided in accordance with the invention.

In FIGURE 1 is seen a clock face 10 provided with raised sections 12 for appropriate engagement with the sides of the clock structure and support of a clock dial. On the face 10 is provided a dial 14 having time indications 16, the time being indicated by a second hand 18 and by minute and hour hands 20 and 22 respectively. Further provided is an indicator 24, the purpose of which is to establish and indicate the time at which utilization devices such as a radio and an alarm clock are to be actuated.

The face 10 of the clock is appropriately held in position by means of bolts, the heads 26 of which are illustrated in FIGURE 1. The face 10 defines a recess 27 in which is positioned a cam member 28 having three small recesses 30, 32 and 34.

Engaging the cam member 28 is a lever 36 whose position can be adjusted to one of the small recesses.

At the face of the clock can also be seen two control knobs 38 and 40. The control knob 38, as will be shown, controls the position of the indicator 24 and the setting for the time control of the switching mechanism. The control knob 40 controls the position of the lever 36 in a manner as will subsequently be described.

Figure 3:
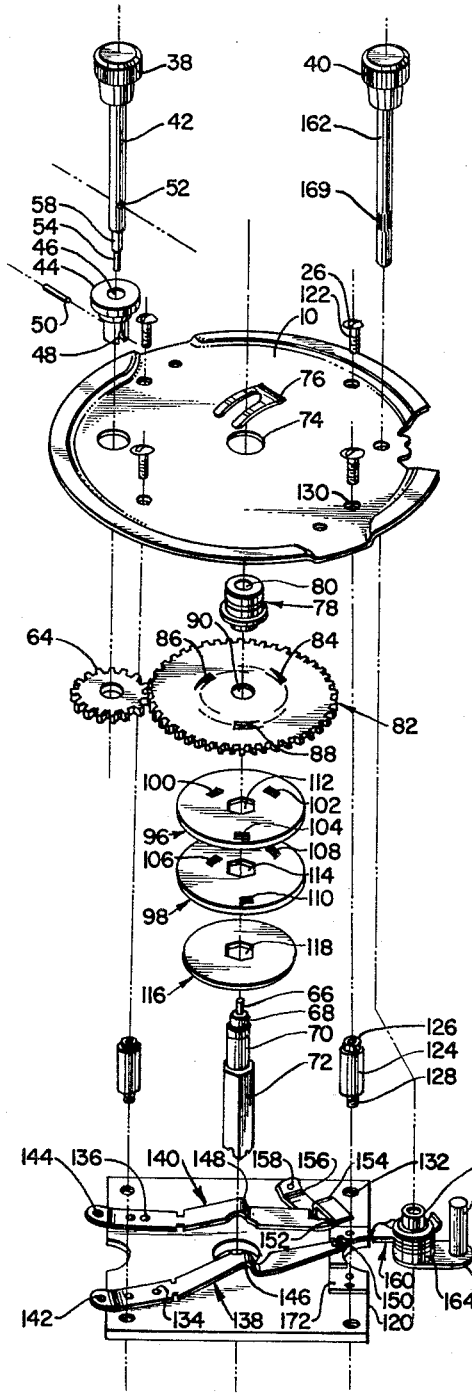
FIGURE 3 is an exploded view illustrating the various components of the switching mechanism provided for in accordance with the invention.
Figure 2:
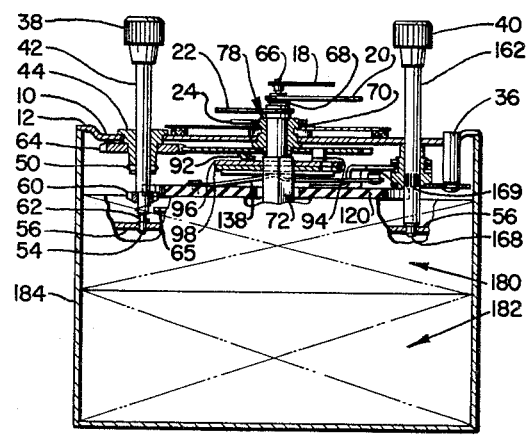
FIGURE 2 illustrates a partially sectional and partially broken away view of the combination clock as seen from a side thereof.

Referring next to FIGURES 2 and 3, it will be seen that the knob 38 is rigidly affixed to a spindle 42 which is rotatably and slidably accommodated in a bushing 44. The bushing 44 is provided with an axial bore 46 for accommodating the spindle 42 and is, moreover, provided with a diametral slot 48 which accommodates a pin 50 firmly set in a diametral bore 52 provided in the spindle 42.

At its lower end 54, the spindle 42 is rotatably accommodated in a hole provided in a metal or plastic sheet 56. At its intermediate section 58, the spindle 42 supports a pinion 60. Intermediate the sheet 56 and the pinion 60 is positioned a helical spring 62, the purpose of which is to urge the pinion 60 in an upwards direction so that the pin 50 firmly seats in the slot 48. Consequently, a gear 64 which is firmly attached to the bushing 44 is rotated when the knob 38 is in its normal elevated position and it will be noted that when the knob 38 is depressed the pin 50 leaves the slot 48 so that the spindle 42 is free to rotate in the bushing 44 without rotating gear 64. Furthermore, with knob 38 depressed, pinion 60 moves into engagement with a gear 65 which, in conventional manner, adjusts the setting of hands 20 and 22.

The second hand 18 is conventionally mounted on a spindle 66 with the minute hand 20 being supported on a spindle 68. The spindles 66 and 68 are accommodated within a hollow shaft 70 which engages the hour hand 22. The lower extremity 72 of the hollow shaft 70 has a polygonal outer configuration, the purpose of which will be hereinafter indicated.

Extending through a centrally located aperture 74 in the face 10 and held in position by a clevis shaped clamp 76 is a bushing 78 which rotatably accommodates in an axial bore 80 the hollow shaft 70 which is free to rotate therein. Firmly engaged with the bushing 78 is a gear 82, the teeth of which normally mesh with the teeth of the gear 64.

The gear 82 defines three arcuate slots 84, 86 and 88 which are preferably angularly spaced by equal angles. At least one of these arcuate slots is, however, radially spaced from the center of the disc or gear 82 by a distance which is different from that of the radial spacing slots 84 and 86. Gear or disc 82 defines a central circular opening 90 which enables the gear to be fit on the lower portion of the bushing 78 for the turning thereof as well as of indicator hand 24.

In FIGURE 2, it is to be noted that the arcuate slots result from the formation of lugs such as the lugs 92 and 94. The arcuate slots 84, 86 and 88 perform no other function in the illustrated structure other than to provide the origin of the downwardly depending lugs whose purpose will be hereinafter indicated.

Engaging the polygonal section 72 of the hollow shaft 70 are two discs or cams 96 and 98. These may be conventionally made of metal, the disc 98 defining arcuate slots or openings 100, 102 and 104 and the disc 98 defining arcuate slots or openings 106, 108 and 110. The slots 100—110 are positioned radially and rotationally in correspondence with the slots or lugs of the disc or gear 82. The discs 96 and 98 are provided with polygonal and centrally located openings 112 and 114 respectively. These openings 112 and 114 are intended to engage the polygonal section 72 so as to cause discs 96 and 98 to rotate with the hollow shaft 70 which supports the hour hand and rotates, in conventional manner, once during each conventionally selected period of twelve or twenty-four hours.

It is to be noted, however, that the polygonal openings 112 and 114 are rotationally displaced relative to each other and relative to the associated arcuate slots in the respective discs. They are, in fact, displaced by an amount whereby, when the discs are superposed in axial abutting relationship, the arcuate slots of the discs 96 and 98 define stepped openings. The opening may extend preferably completely through the abutting pair of discs such as to afford at least two steps for the lugs on the disc 82 to follow.

When the discs 96 and 98 are made of metal, there is normally provided an insulating disc 116 having a polygonal aperture 118 so that the disc 116 can be readily accommodated on the polygonal section 72.

Rigidly supported at a fixed distance from the face 10 and parallel thereto is a block 120 of insulating material. This block is supported in fixed position by means of bolts 122 threadably accommodated in sleeves 124, the narrow extremities 126 and 128 of which fit in holes 130 and 132 respectively provided in the face 10 and the block 120.

Fixed to the block 120 by rivets 134 and 136 are leaf springs 138 and 140 which are preferably made of a resilient material such as beryllium copper. At one of their respective extremities, the springs 138 and 140 are provided with apertures 142 and 144 for convenient connection to an associated circuit of, for example, an electric alarm or a radio.

The springs 138 and 140, which are cantilever in nature, are provided with raised portions 146 and 148, the function of which is to engage the disc 116 and to follow the movements thereof. At the free extremities of the springs 138 and 140 are provided contacts 150 and 152.

Mounted on the block 120 is a fixed contact 154 which is part of a metal strip 156 having an aperture 158 to which may be connected a line from an associated circuit. The contact 150, however, is intended to make physical contact with a stepped contact 160 which is mounted on a shaft 162 by means of a support 164. The support 164 is rigidly connected with a flexible plate 166 which rigidly accommodates the lever 36 which, as indicated above, engages the cam member 28. The shaft 162, as best seen in FIGURE 2, is controlled by a rotation of the knob 40, a narrowed down portion 168 of the shaft 162 being rotatably accommodated in a circular opening provided in the sheet 56. Shaft 162 is knurled at section 169 for engaging support 164.

Referring next to FIGURES 4 and 5, as well as to FIGURE 3, it is to be noted that the stepped contact 160 comprises a tail section 170 which slidably (for electrical continuity) engages a metal or conductive plate 172 supported on the block 120. The plate 172 is adapted for connection to a line from an associated electrical circuit. The rotation of the support 164, by virtue of a rotation of the knob 40 of the associated shaft 162, selectively positions beneath the contact 150 one of a number of step sections 174, 176 and 178 of the stepped contact 160. The operation of the lever 36 in relation to the cam member 28 provides that the stepped switch 160 is rotatable in discrete increments by virtue of which one of the step sections 174, 176 and 178 is properly positioned beneath the contact 150. The stepped contact 160 is preferably made of beryllium copper so that an engagement between the tail section 170 and the plate 172 is firmly and resiliently maintained.

From what has been stated above, it will be appreciated that the leaf springs 138 and 140 are normally maintained underload, i.e., they are stressed and depressed downwardly with respect to the alignment of the clock illustrated in the drawing, and it will be subsequently shown that the operation of the contacts 150, 152, 154 and 160 results directly from an unloading of the physical forces normally applied to the leaf springs 138 and 140.

Thus, the only forces required to actuate the switches provided by the invention, are the forces necessary to rotate the discs 96, 98 and 116 while overcoming the very nominal frictional forces which ensue between the leaf springs and the disc 116. In this regard it is to be further noted that the disc 116 can be of a plastic such as "Bakelite" or the like providing a very glossy surface and minimizing friction.

Accordingly a conventional clock-work mechanism can be utilized for driving the shaft 70 and for providing the necessary gearing between the hour, minute and second shafts. Moreover, the entire structure can be provided with a constant-torque direct-current motor such as shown in Ishikawa Patent No. 2,779,882, dated Jan. 29, 1957, the motor being driven by a small source of direct-current power or battery.

The clock-work mechanism is generally and diagrammatically indicated by block 180 and the motor is likewise diagrammatically indicated by block 182. These mechanisms may be conventional per se but their efficient operation is permitted only in combination with the switches provided in accordance with the invention which enable the tapping off of a minimum of mechanical power while, nevertheless, achieving a switching function.

It is to be noted that the switches, the clock mechanism and the motor can all be encased in a simple metal or plastic casing 184 which is both small and very simple and which at its uppermost extreme accommodates the clock face 10 and its raised sections 12 which prevent a relative rotation between the mechanism itself and the casing.

Figure 6:
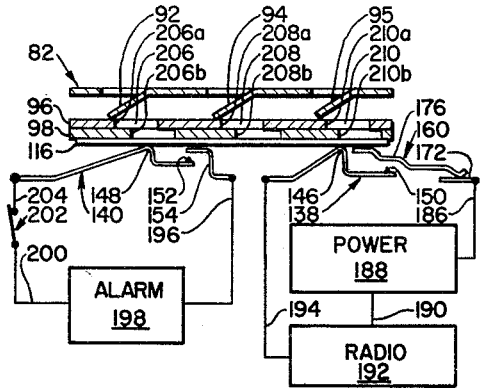
FIGURES 6–8 illustrate the time sequence operation of the switching mechanism with the settable contact fixed in determinable position.
Figure 7:
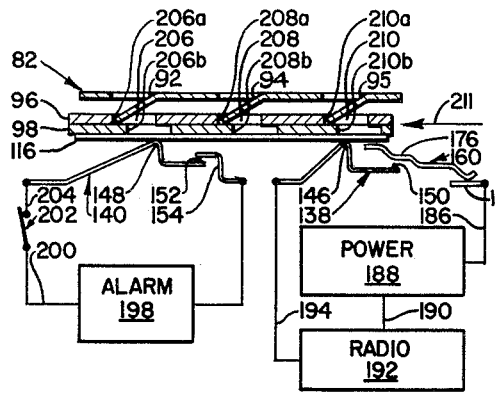
Figure 8:
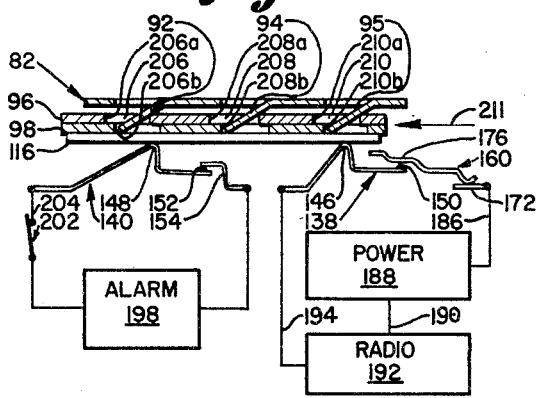

FIGURES 6–8 indicate the operation of the switching mechanism for a predetermined setting of the stepped contact 160 and, in FIGURES 6–8, the intermediate step section 176 is shown aligned for making contact with the contact 150 of the leaf spring 138. It will be readily appreciated that the leaf spring 138 and the stepped contact 160 constitute a switch in a circuit comprising in series an electrical line 186, a source of power 188, a line 190, a radio 192 and a line 194. The source of power 188, which can be a battery, and the radio 192 are conventional and can be integrated into a single unit.

The leaf spring 140 and the fixed contact 154 likewise constitute a switch connected in a circuit comprising in series a line 196, an alarm 198, a line 200, a manually operated switch 202 and a line 204.

The alarm 198 can be a conventional buzzer mechanically driven or provided with its own integrated source of direct-current power or may be an alarm which is driven by the same source which drives the motor 182. The manual switch 202 provides for the manual controlling of the alarm 198 after its operation has been initiated.

The structure thus indicated in FIGURES 6–8 is representative of a combination clock mechanism which includes both an automatically operated radio and an automatically operated alarm. It will be appreciated that one of these mechanisms can be omitted, if desired, or that additional mechanisms or utilization devices can be provided with additional automatic switches. It will next be shown that the step contact 160 is illustrated in a position whereby the alarm 198 and the radio 192 operate sequentially. The sequence is reversible by connecting the utilization devices to the appropriate switches.

The gear or disc 82 is shown in a position at which it has been set by manipulation of the knob 38 (see FIGURES 1–3). Its downwardly depending lugs 92, 94 and 95 are thus positioned as determined in accordance with the wishes of the user or operator. Discs 96 and 98 which are positioned in axially abutting relationship define, by virtue of their relatively displaced polygonal openings 112 and 114 (see FIGURE 3), stepped openings 206, 208 and 210 each including, respectively, portions 206a, 206b, 208a, 208b, 210a and 210b. The rotational displacement of discs 96 and 98 is predetermined and the angular displacement between the portions of the stepped openings are equal and in correspondence with a time period such as, for example, 10 minutes which is determined both by the speed of rotation of the discs 96 and 98 (one rotation per twelve or twenty-four hours) and by the angular displacement.

Leaf springs 138 and 140 urge, by means of their raised portions 146 and 148, the disc 116 against discs 96 and 98, thereby urging the same into contact with the depending lugs 92, 94 and 95. The leaf springs 138 and 140 are thus under load, and, consequently, are spaced from their respectively associated fixed contacts 160 and 154.

Due to the rotation of discs 96, 98 and 116 as indicated by the arrow 211 in FIGURE 7, the discs 96, 98 and 116 move to a position whereby the portions 206a, 208a and 210a of the stepped openings 206, 208 and 210 accommodate the lugs 92, 94 and 95. Leaf springs 138 and 140 consequently urge discs 96, 98 and 116 axially along polygonal shaft 72 (see FIGURE 3) in the direction of the disc 82 by a distance which corresponds to the thickness of disc 98 which defines portion 206a.

As a consequence of this operation, contact 152 of leaf spring 140 meets with fixed contact 154 by reason of the fact that the normal spacing therebetween is substantially equal to or somewhat less than the thickness of the disc 96. Accordingly, the circuit including the alarm 198 is closed and the alarm 198 is thus actuated assuming that the manually controlled switch 202 is closed. Normally, the operator will be awakened and open switch 202, thus terminating the audio alarm created by alarm 198. During this operation, however, the leaf spring 138, although it has been unloaded by an amount equal to that of the leaf spring 140, fails to make contact with the stepped contact 160. The reason for this is that the spacing between contact 150 and the intermediate section 176 of the stepped contact 160 exceeds the spacing normally existing between the contact 152 and the fixed contact 154. Accordingly, although the movable contact 150 has moved towards the step section 176, it does not meet with the same. The radio 192 is therefore not yet actuated.

FIGURE 8 indicates that a further movement during a determinable period of time by discs 96 and 98 causes lugs 92, 94 and 95 to be accommodated within portions 206b, 208b and 210b of stepped openings 206, 208 and 210. Leaf springs 138 and 140 thus urge discs 96 and 98 towards disc 82 by a distance which equals the sum thickness of discs 96 and 98, a further axial displacement being prevented due to the presence of disc 116. The result of this operation is that contacts 152 and 154 maintain engagement and are, in fact, more firmly engaged and that, as a more important aspect of this operation, the contact 150 on the leaf spring 138 moves into engagement with the step section 176 of the stepped contact 160. The circuit is therefore closed between the leaf spring 138 and the conductive plate 172 and the radio is thereby actuated if previously conditioned to be operative. For this purpose, the radio 192 comprises a conventional on-off switch, not shown, which may be actuated at will and in preparation for the operation of the leaf spring 138.

As a result of the above sequence of operations, an alarm and a radio are sequentially actuated by means of a switch requiring a minimum of power. It will follow, in due course that the continued rotation of discs 96 and 98 will cause lugs 92, 94 and 95 to resume the positions indicated in FIGURE 6, whereupon the operation will be cyclically repeated.

Figure 9:
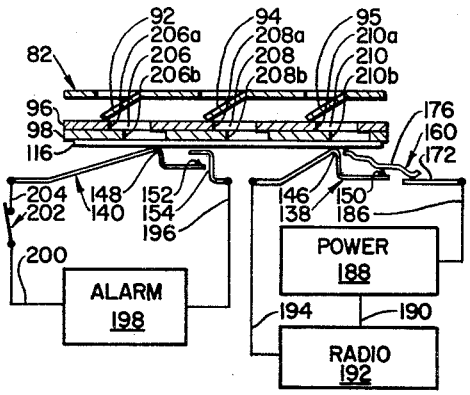
FIGURE 9 illustrates diagrammatically the operation of the switching mechanism with the settable contact in a different position.
Figure 10:
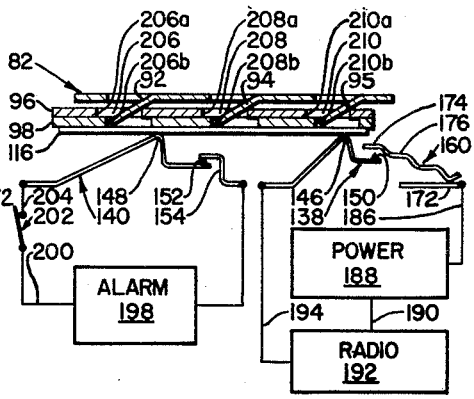
FIGURE 10 illustrates the operation of the device with the settable contact in still another position.

The provision of the stepped contact 160 and its selectivity or maneuverability enables the radio to be selectively used as indicated above or to be permanently cut into and out of its associated circuit as indicated in FIGURES 9 and 10.

For example, in FIGURE 9 the relationship of discs 82, 96 and 98 is the same as in previously inspected FIGURE 6. However, step section 178 of stepped contact 160 is now aligned with contact 150 on leaf spring 138. This means that with leaf spring 138 in fully loaded condition and displaced by a maximum amount, contact 150 nevertheless meets with stepped contact 160 thus closing the circuit of radio 192. As a consequence, the operation of radio 192 is independent of the relative positions of discs 82, 96 and 98 and the radio is continuously operable independent of any time function. Thus, the radio 192 can be played or operated as a simple conventional radio.

In instances where the use of the radio as part of a time controlled mechanism is not desired, provision is made for continually maintaining the circuit of the radio 192 open. In this event, step section 174 of stepped contact 160 is aligned with contact 150 and even though the discs 82, 96 and 98 assume the positions previously indicated in FIGURE 8, the contact 150 never meets with step section 174 and the circuit of radio 192 is never closed. Consequently, although the alarm 198 is operated during the periodic rotation of the associated movable members, the radio does not play.

It will be appreciated that although a preferred arrangement and sequence of operations has been indicated, the arrangement is exemplary only of all the permutations which are possible in accordance with the invention. For example, discs 96 and 98 can be made of a single piece. It is important to note, however, that these operations and permutations are permissible only by reason of the various features of the invention and that, furthermore, a battery-operated combination alarm-radio clock mechanism can only operate efficiently due to the low mechanical power requirements of the improved system.

It is to be further understood and appreciated that the mechanism provided in accordance with the invention, as well as the combination, is of simple and economical design and has an optimum reliability.

FIGURES 11 and 12 are respectively perspective and side views of a further embodiment of the invention wherein a switch blade or leaf spring 212 is mounted on an insulating plate 214. The spring 212 is biased against a cam assembly 216 in the manner previously described, the cam assembly being driven by a shaft 218.

The spring 212 is adapted for dropping against a further leaf spring and, in fact, is unloaded in two steps as described above. With the first step, spring 212 simply makes electrical contact with spring 220 and, with the second step, spring 212 urges spring 220 against a fixed contact 222. For this latter purpose, spring 220 is of a more flexible material than is spring 212.

A source of electrical power can be connected to terminal 224 and utilization devices can be connected to terminals 226 and 228. The utilization devices are thus supplied power sequentially and in parallel.

To enable control of the operation of the switch, there is provided a manually operated shaft 230 on which are positioned two wiper arms 232 and 234. Arm 232 wipes across spring 220 to urge the same permanently into contact with spring for a permanent ON condition when desired; arm 234 wipes over spring 212 thus preventing contact between springs 212 and 220 for a permanent OFF condition.

The invention thus incorporates the principle of unloading a spring into a device wherein the number of necessary contacts is reduced.

There will now be obvious to those skilled in the art many modifications and variations of the structures and combination set forth. These modifications and variations will, however, not depart from the spirit of the invention as defined in the following claims.

What is claimed is:
1. A radio alarm clock comprising a radio, an alarm, a clock mechanism, a low power battery, a direct current motor coupled to the battery and connected to and driving the clock mechanism, and means for actuating said alarm and radio, said means having a normal spring-loaded condition during which said alarm and radio are inactive and being responsive to the clock mechanism for assuming a condition of no load for actuating the alarm and radio.

2. A radio alarm clock comprising a radio, an alarm, a clock mechanism, a direct current motor coupled to the clock mechanism for driving the latter, a low power battery coupled to the motor for driving the same, a control responsive to the clock mechanism for performing a time selection operation, said control being adapted to be primed for operation by a source of potential energy, and a switch coupled to the radio and alarm for actuating the same and being controlled by said control, the switch constituting said source of potential energy.

References Cited in the file of this patent
UNITED STATES PATENTS

| | | |
|---|---|---|
| 1,469,056 | Sullivan | Sept. 25, 1923 |
| 1,686,408 | Dietrich | Oct. 2, 1928 |
| 1,860,159 | Porter | May 24, 1932 |
| 1,922,946 | Greis | Aug. 15, 1933 |
| 2,096,620 | Robertson | Oct. 19, 1937 |
| 2,215,842 | Thomsen | Sept. 24, 1940 |
| 2,440,142 | Elliott | Apr. 20, 1948 |
| 2,455,161 | Buttner | Nov. 30, 1948 |
| 2,467,936 | Hummel | Apr. 19, 1949 |
| 2,512,775 | Parissi | June 27, 1950 |
| 2,545,617 | Kaefer et al. | Mar. 20, 1951 |
| 2,650,987 | Doyle | Sept. 1, 1953 |
| 2,651,166 | Dorfman | Sept. 8, 1953 |
| 2,758,181 | Crouch | Aug. 7, 1956 |
| 2,779,882 | Ishikawa | Jan. 29, 1957 |
| 2,782,274 | Powers et al. | Feb. 19, 1957 |
| 2,783,835 | Poole | Mar. 5, 1957 |
| 2,816,969 | Gallagher et al. | Dec. 17, 1957 |
| 2,825,401 | Kull | Mar. 4, 1958 |
| 2,832,856 | Goodhouse | Apr. 29, 1958 |
| 2,864,231 | Springer | Dec. 16, 1958 |
| 2,873,572 | Gibbs et al. | Feb. 17, 1959 |